(12) United States Patent
Ippolito

(10) Patent No.: US 10,000,365 B2
(45) Date of Patent: Jun. 19, 2018

(54) PULLEY FOR HIGH-EFFICIENCY WINCH

(71) Applicant: KITE GEN RESEARCH S.R.L., San Mauro Torinese (IT)

(72) Inventor: Massimo Ippolito, San Mauro Tourinese (IT)

(73) Assignee: KITE GEN RESEARCH S.R.L., San Mauro Torinese (IT)

( * ) Notice: Subject to any disclaimer, the term of this patent is extended or adjusted under 35 U.S.C. 154(b) by 483 days.

(21) Appl. No.: 14/786,151

(22) PCT Filed: Mar. 26, 2014

(86) PCT No.: PCT/IT2014/000082
§ 371 (c)(1),
(2) Date: Oct. 21, 2015

(87) PCT Pub. No.: WO2014/174542
PCT Pub. Date: Oct. 30, 2014

(65) Prior Publication Data
US 2016/0145082 A1    May 26, 2016

(30) Foreign Application Priority Data
Apr. 22, 2013  (IT) .............................. TO2013A0323

(51) Int. Cl.
*B66D 1/74*    (2006.01)
*F16H 55/50*    (2006.01)

(52) U.S. Cl.
CPC ............. *B66D 1/7415* (2013.01); *B66D 1/74* (2013.01); *F16H 55/50* (2013.01)

(58) Field of Classification Search
CPC .......... B66D 1/74; B66D 1/7415; F16H 55/50
USPC .......................................................... 254/390
See application file for complete search history.

(56) References Cited

U.S. PATENT DOCUMENTS

| | | | | |
|---|---|---|---|---|
| 3,105,676 | A | * | 10/1963 | Brickbank et al. ..... B63B 35/04 226/190 |
| 6,182,915 | B1 | * | 2/2001 | Kvalsund ............... B65H 51/12 242/364.2 |
| 6,877,720 | B1 | * | 4/2005 | Dublin, Jr. ............... B66D 3/04 254/390 |
| 2016/0068377 | A1 | * | 3/2016 | Ippolito ................... B66D 1/74 254/390 |

FOREIGN PATENT DOCUMENTS

| | | |
|---|---|---|
| FR | 383514 | 3/1908 |
| GB | 1211248 | 11/1970 |
| GB | 1237637 | 6/1971 |
| WO | 0168505 | 9/2001 |

* cited by examiner

*Primary Examiner* — Michael E Gallion
(74) *Attorney, Agent, or Firm* — Pasadena Legal Group; Norman R. Van Treeck

(57) ABSTRACT

An improved pulley for winch is described, in contact with at least one section of rope included between an inlet section, connected to a working load, and an outlet section, with minimum or null tension, such pulley comprising a kinematic chain composed of peripheral supports.

10 Claims, 3 Drawing Sheets

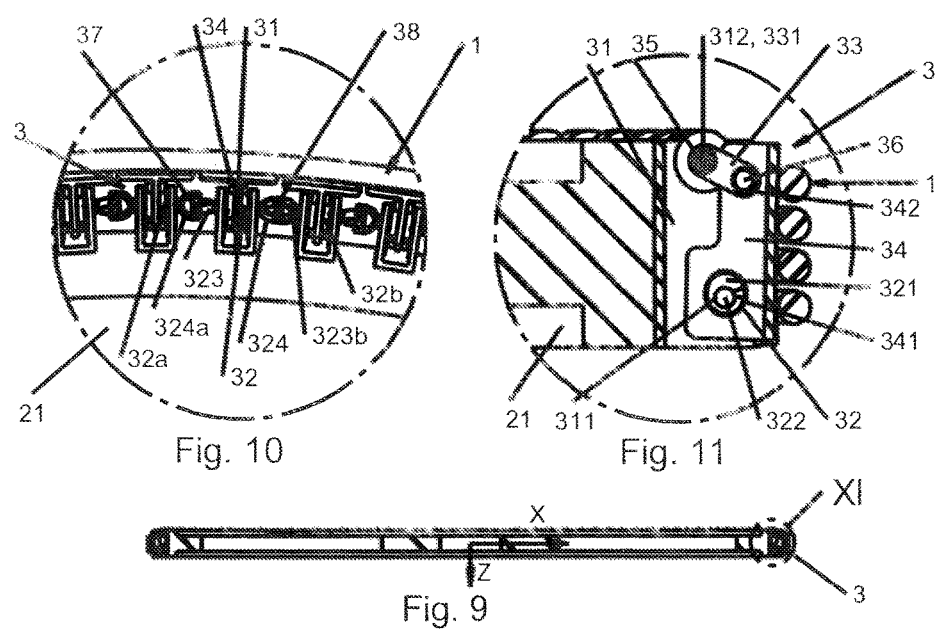
Fig. 10     Fig. 11
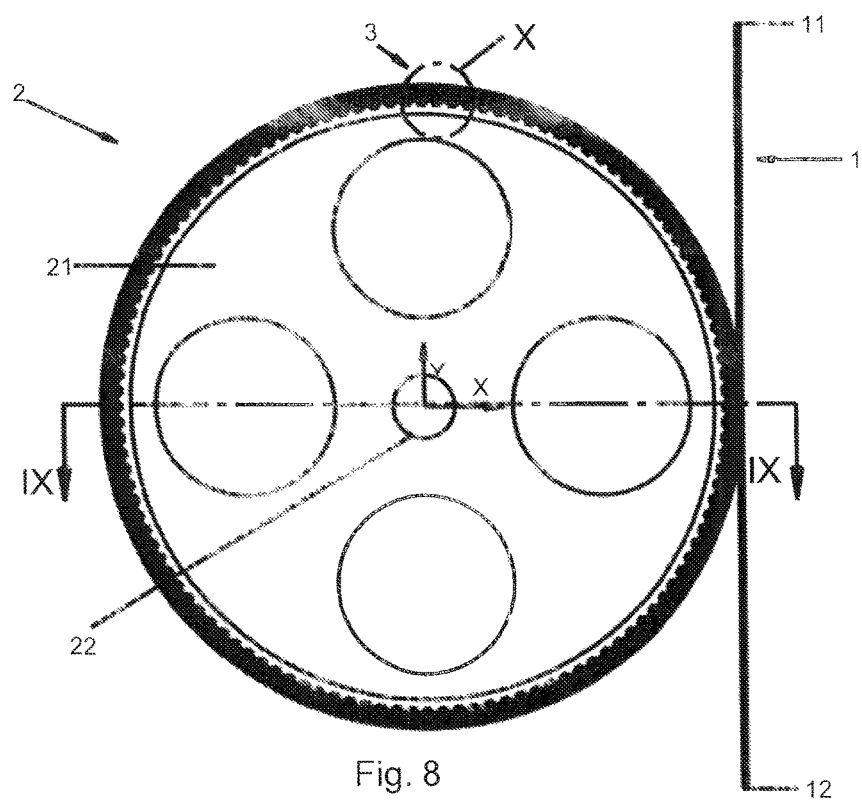
Fig. 9
Fig. 8

PULLEY FOR HIGH-EFFICIENCY WINCH

CROSS-REFERENCE TO RELATED APPLICATIONS

The present Application is a national stage of International Patent Application No. PCT/IT2014/000082, titled "Improved Pulley for High-Efficiency Winch," filed 26 Mar. 2014, which claims priority from Italian Patent Application No. TO2013A000323 filed 22 Apr. 2013, the contents of which are incorporated in this disclosure by reference in their entirety.

BACKGROUND OF THE INVENTION

1) Field of the Invention

The present invention deals with an improved pulley for high-efficiency winch, of the type used for transmitting mechanical energy by means of traction forces applied to ropes connected to a moving load.

A high-efficiency winch is used in several applications, for lifting or moving a load, dragging a rope and transmitting energy by means of a rope adapted to be wound.

2) Background Art

Recently, the application of winches for transmitting energy has become important in the sector of managing wind energy, wherein the winches, connected to alternators and electronic power apparatuses, are used for extracting kinetic energy from wind and for converting the produced mechanical energy into electric energy.

An important aspect in recovering mechanical energy from ropes connected to a moving load is given by the efficiency of the driving winch, for which: small percentages of energy imply a high heating of the driving pulleys and of the rope.

A process for extracting energy from wind implies the use of high-resistance ropes. The rope tension is generated by the lift of a kite flying with transverse wind. The pulley or the drum, on which the rope is wound, rotates due to the unwinding force induced by the rope itself. The mechanical power is generated by the combination of the mechanical tension in the rope and the speed with which the rope is stretched, being unwound from the pulley.

The pulley or the drum, on which the rope is wound, rotates due to the unwinding force induced by the rope itself. During this process, the wind kinetic energy is firstly converted into mechanical energy, due to the friction between rope and contact surface of the pulley or the drum; it is then converted into electric energy through alternators connected to the winch.

During the conversion, energy losses occur as heat which heats the contact surface of the pulley and increases the internal temperature of the rope compromising the mechanical properties due to overheating.

Conventional winches are not suitable for transmitting a great amount of energy due to their low efficiency. When there is a high-power winch equipped with high-resistance ropes, even a relatively small part of lost power could be critical. For example, a winch with a 97% efficiency, used for manipulating a power of 1.5 MW, generates a 45 kW thermal flow which must be suitably dissipated to prevent the rope from overheating. Together with the losses generated by the bearings of the rotary elements, the heat flow is mainly generated by the friction forces between rope and pulley.

Friction inside the rope is generated by relative displacements and distortions of different wires and braids, composing the rope and geometrically arranged in order to mutually scrape. On the other hand, friction between rope and pulley is the necessary ingredient to allow the winch to extract energy from the rope, while friction depending on any relative displacement between rope and pulley must be reduced to a minimum.

The architecture of a high-efficiency winch must comply with two concepts: the rope moving along the winch is subjected to a tension gradient associated with a distortion gradient depending on the nature of the material composing the rope; the rope wound on a pulley for more than one revolution, assuming that the pulley rotates with respect to its own longitudinal axis, must necessarily translate perpendicular to the direction of the main transmission force, for example along the longitudinal axis of the pulley, in order to prevent rope sections with different curvatures from overlapping.

WO2011121272 discloses an application dealing with the first concept, aimed to make more uniform the distortion gradient, making the rope less stressed and subjected to degrade effects. This problem is solved with two co-penetrating pulleys, each one of which defines a discontinuous surface of the contact between rope and drum.

FR1105165 discloses a layout of a winch dealing with the second concept, comprising pulleys with cylindrical grooves whose diameter gradually decreases or increases being adapted to the different distortion status along the rope, so that the groove with bigger diameter is in contact with the rope section subjected to a high tension status and vice versa.

SUMMARY OF THE INVENTION

Object of the present invention is solving the above prior art problems, by providing an improved pulley for high-efficiency winch, in favor of higher energy productivity and a reduction of the power losses due to friction phenomena, and in favor of a reduced rope wear.

The above and other objects and advantages of the invention, as will result from the following description, are obtained with an improved pulley as claimed in claim 1 in contact with a section of rope included between two terminals, one of which is connected to a working load, the other being f minimum or null tension, characterized in that it comprises a kinematic chain formed of peripheral supports. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention as appears from the enclosed claims.

BRIEF DESCRIPTION OF THE DRAWINGS

The present invention will be better described by some preferred embodiments thereof, provided as non-limiting example, with reference to the enclosed drawings, in which:

FIG. 8 shows a front view of the pulley of FIG. 1;

FIG. 9 shows a sectional view, along a plane passing on line IX-IX of FIG. 8, of the pulley of FIG. 1;

FIG. 10 shows an enlarged part X belonging to FIG. 8;

FIG. 11 shows an enlarged part XI belonging to FIG. 9.

DETAILED DESCRIPTION OF PREFERRED EMBODIMENTS

Figure 1:
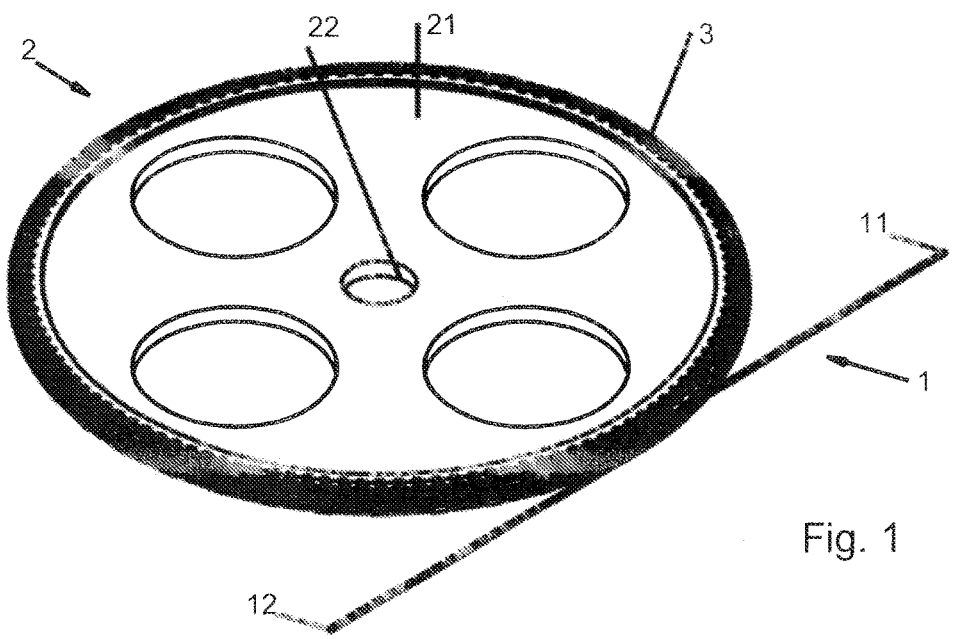
FIG. 1 shows an axonometric view of a pulley connected to a rope comprising a kinematic chain of peripheral supports, according to the present invention.

With reference to FIG. 1, at least one section of a rope 1, included between an inlet section 11 and an outlet section 12, is wound by three revolutions on a pulley 2.

The pulley 2 is composed of at least one disk 21 equipped with a central hole 22 used for centering and joining with a shaft (not shown) connected to a high-efficiency winch (not shown).

The inlet 11 and outlet 12 sections of the rope 1 are respectively connected to a working load (not shown) and to a storage device (not shown) according to a tension gradient which established a maximum tension value at the inlet section 11 and a minimum or null tension value at the outlet section 12.

The disk 21 supports the coils of the rope 1 by means of a kinematic chain formed of peripheral supports uniformly connected and distributed along a circumference.

With reference to FIGS. 3 to 7, each peripheral support 3 is composed of:

at least one frame 31, obtained from an extruded material with U-shaped cross section, in which at least two pair of bushed holes 311 and 312 are housed;

at least one crank 32, formed of a collar-type eccentric 321, whose internal axis is occupied by a pin 322 at whose ends forks 323 and 324 are placed;

at least one rocker-type rod 33, wherein two bushed hoes 331 and 332 are housed;

at least one connecting rod 34, obtained from an extruded material with a T-shaped cross section, equipped with at least two bushed holes 341 and 342.

With reference to FIGS. 8 to 11, each peripheral support 3 is integral with the periphery of the disk 21 through the frame 31. The crank 32 is connected to the frame 31 through the pin 322, this one being keyed-in in the pair of coaxial holes 311. The rocker-type rod 33 is connected to the frame 31 through a pin 35, this latter one being keyed-in respectively in the pair of coaxial holes 312 and in the hole 331. The connecting rod 34 is respectively connected to the crank 32 and to the rocker-type rod 33 through the eccentric 321 keyed-in in the hole 341, and through a pin 36 keyed-in in the hole 342 and in the hole 332.

The forks 323 and 324, belonging to the crank 32, are geometrically configured with a certain offset T (as can be noted, for example, in FIG. 5) with respect to a plane perpendicular to the pin 322 axis.

The rope 1 is wound by three revolutions on the pulley 2 through the contact with the back surface of each connecting rod 34.

Each peripheral support 3 is kinematically connected to the two adjacent supports through the union of forks 323 and 324 integral with a crank 32, respectively with a first fork 324a integral with a first adjacent crank 32a, and with a second fork 323b integral with a second adjacent crank 32b (as can be noted, for example, in FIG. 10).

Each peripheral support 3 is an articulated mechanism, kinematically equivalent to an articulated quadrilateral, comprising a collar-type eccentric 371, a rocker-type rod 33 and a connecting rod 34, this latter one being in contact with the sections of the rope 1.

The kinematic chain composed of the peripheral supports s, connected through the forks 323 and 324 integral with each eccentric 321, makes a discontinuous contact between the rope 1 and the pulley 2 able to make the tension gradient discrete along the section of rope 1 included between the ends 11 and 12.

The kinematic chain composed of the peripheral supports 3, connected through the forks 323 and 324, in addition to make a discontinuous contact between rope 1 and pulley 2, allows making a mobile contact actuated through suitable actuators (not shown) according to an reciprocal motion law.

The reciprocal motion of each peripheral support 3 is offset with respect to the reciprocal motion of the adjacent peripheral supports 3.

The offset between the forks 323 and 324 of each peripheral support 3 has an arbitrary value included between 0 degrees and 360 degrees.

The pulley 2, coupled with the kinematic chain formed of the peripheral supports 3, reaches the object of the invention having made discrete the tension gradient of the rope 1 wound on the periphery of the pulley 2 by several revolutions.

Figure 2A:
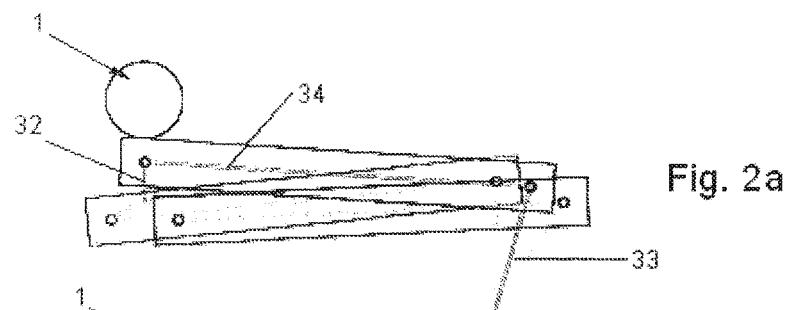
FIGS. 2, 2b and 2c show a transverse view of the development of three connected and adjacent articulated mechanisms, dealing with the peripheral supports of the pulley of FIG. 1.
Figure 2B:
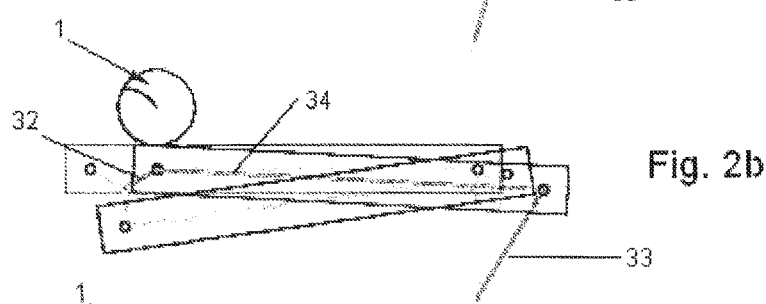
Figure 2C:
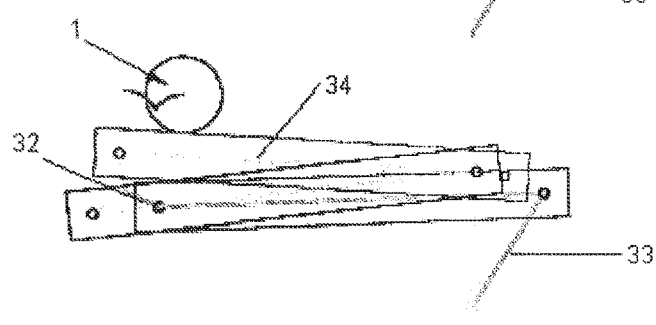
Figure 3:
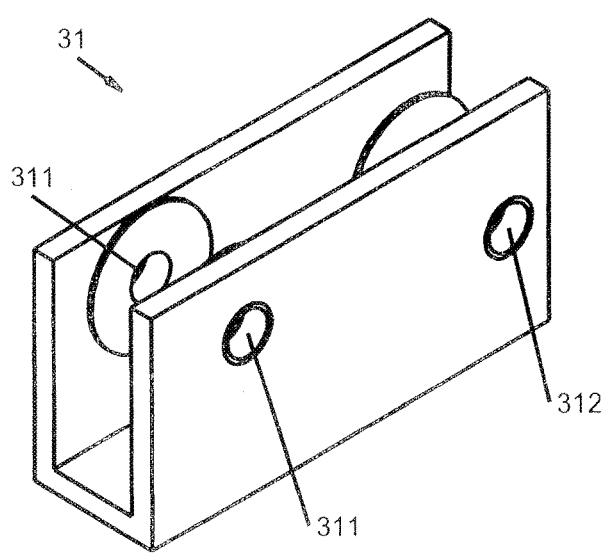
FIGS. 3, 4, 6 and 7 show an axonometric view of components belonging to each peripheral support connected to the pulley of FIG. 1.
Figure 4:
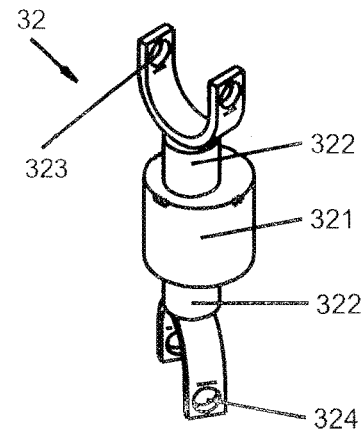
Figure 5:
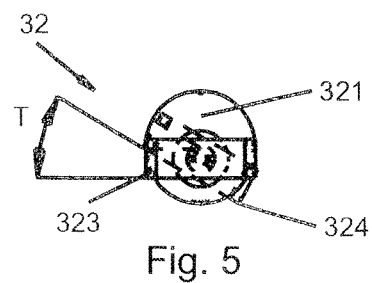
FIG. 5 shows a front view of the component of FIG. 4.
Figure 6:
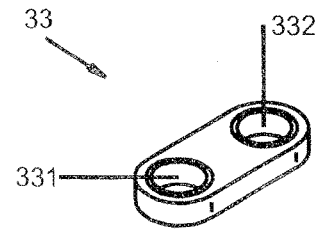
Figure 7:
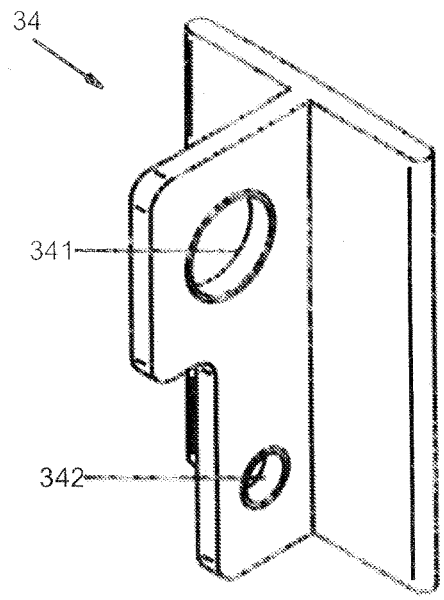

In particular, the adopted solution allows:

nullifying the tension gradient along each section of rope lacking contact with the peripheral support making an helical winding of the rope 1 along a generatrix formed by the contact surface of each connecting rod 34;

obtaining a reciprocal and offset motion of each peripheral support 3 by means of a mechanism kinematically equivalent to an articulated quadrilateral, as preferred embodiment obtained with an eccentric rotor and a connecting rod (FIGS. 2a, 2b and 2c).

Further arrangements which are deemed variations of the solution of the present invention are described below.

Said reciprocal and offset motion of each peripheral support is made by means of a mechanism kinematically equivalent to an articulated pentalateral device, wherein an additional rod (not shown) allows performing an approximately square-shaped trajectory, by overlapping a further armonic motion.

The mechanism kinematically equivalent to an articulated pentalateral device is of the type in which two of the five rods (not shown) are mechanically made through eccentrical rotors equipped with hearings, said eccentrical rotors having independent rotation speeds and predetermined phases, one of said independent rotation speeds being preferably three times the other.

The radial profile of each peripheral support 3, measured in a plane X-Z (FIG. 9), is subjected to an exponential function to be adapted to the tension gradient variable along the rope 1.

The back surface of each connecting rod 34, in contact with a section of rope 1, has a profile, measured in a plane X-Y (FIG. 8), with a circumferentially rounded shape (not shown).

The kinematic chain formed of the peripheral supports 3 is connected by means of cardan joints or equivalent.

Said reciprocal motion can be actuated by cams or mechanical actuators.

Said reciprocal motion can also be actuated by electric motors or electromagnetic actuators.

Said reciprocal motion is exploited in a winch comprising a device (not shown) capable of storing and quickly releasing, during its tensioning, a certain amount of the rope 1 from the part 11 with high tension, or the part 12 with low tension.

Said reciprocal motion is exploited in a winch comprising a device (not shown) capable of adjusting and limiting the tension of the rope 1 from the part 11 with high tension, or the part 12 with low tension.

A winch, composed of at least one pulley 2 equipped with peripheral supports 3, supports and guide a rope 1 wound by one revolution, preferably by three revolutions, said rope 1 being stored in a low tension state 12.

A winch is composed of n pulleys 2 equipped with peripheral supports 3, at least two of which pulleys are motored.

A winch is composed of four motored pulleys 2, equipped with peripheral supports 3, said pulleys 2 being arranged on the vertexes of an ideal rectangle.

A winch is composed of four motored pulleys 2, equipped with peripheral supports 3, said pulleys 2 being arranged along non-mutually parallel rotation axes.

The invention claimed is:

1. A pulley for a winch, in contact with at least one section of rope included between an inlet section, connected to a working load, and an outlet section, with a minimum or null tension, the pulley comprising:
    a) a kinematic chain formed of peripheral supports, each of the peripheral supports being an articulated quadrilateral composed of at least one frame integral with at least one disk;
    b) at least one crank;
    c) at least one rocker-type rod and at least one connecting rod in contact with the section of the rope, where each one of the peripheral supports is connected to two of the adjacent peripheral supports through a union of forks integral with the crank, respectively with a first fork integral with a first adjacent crank, and with a second fork integral with a second adjacent crank.

2. The pulley of claim 1, where each one of the peripheral supports is actuated through a motor according to a reciprocal motion law.

3. The pulley of claim 1, where the crank comprises a collar-type eccentric, whose internal axis is occupied by a pin at whose ends the forks are placed, and in that the forks are geometrically configured with an offset (T) with respect to a plane perpendicular to the axis of the pin.

4. The pulley of claim 3, where the reciprocal and offset motion of each one of the peripheral supports is made by means of a mechanism kinematically equivalent to an articulated pentalateral device.

5. The pulley of claim 4, where two of five rods comprising the articulated pentalateral device are mechanically made through eccentrical rotors having independent rotation speeds and predetermined phases.

6. The pulley of claim 5, where one of the independent rotation speeds is three times the other.

7. The pulley of claim 4, where a radial profile of each one of the peripheral supports, measured in a plane X-Z parallel to a rotation axis of the pulley, is subjected to an exponential function to be adapted to a tension gradient variable along the rope.

8. The pulley of claim 7, where a back surface of each one of the connecting rods, in contact with a section of the rope, has a profile, measured in a plane X-Y perpendicular to the rotation axis, with a circumferentially rounded shape.

9. The pulley of claim 1, where the kinematic chain formed of the peripheral supports are connected by means of cardan joints.

10. The pulley of claim 1, where the kinematic chain formed of the peripheral supports is connected by means of cardan joints and the reciprocal motion is actuated by cams or mechanical actuators, electric or electromagnetic actuators.

* * * * *